United States Patent
Krishnamoorthi et al.

(10) Patent No.: US 10,089,089 B2
(45) Date of Patent: Oct. 2, 2018

(54) DATA TYPE REASSIGNMENT

(71) Applicant: The MathWorks, Inc., Natick, MA (US)

(72) Inventors: Anand Krishnamoorthi, Arlington, MA (US); Kiran K. Kintali, Ashland, MA (US); Ebrahim Mehran Mestchian, Newton, MA (US); Srinivas Muddana, Cambridge, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/170,439

(22) Filed: Jun. 1, 2016

(65) Prior Publication Data

US 2016/0357534 A1 Dec. 8, 2016

Related U.S. Application Data

(60) Provisional application No. 62/170,427, filed on Jun. 3, 2015.

(51) Int. Cl.
    *G06F 9/45* (2006.01)
    *G06F 8/51* (2018.01)
    *G06F 8/41* (2018.01)

(52) U.S. Cl.
    CPC ............. *G06F 8/51* (2013.01); *G06F 8/437* (2013.01)

(58) Field of Classification Search
    None
    See application file for complete search history.

(56) References Cited

U.S. PATENT DOCUMENTS 5,821,934 A * 10/1998 Kodosky ............ G06F 3/04847
                                                  703/15
6,226,789 B1 * 5/2001 Tye ....................... G06F 8/52
                                                  717/138

(Continued)

OTHER PUBLICATIONS

International Organization for Standardization and International Electrotechnical Commission, "ISO/IEC 9899:TC3," http://www.open-std.org/jtc1/sc22/WG14/www/docs/n1256.pdf, Sep. 7, 2007, 552 pages.

(Continued)

*Primary Examiner* — Chameli Das
(74) *Attorney, Agent, or Firm* — Harrity & Harrity, LLP

(57) ABSTRACT

A device may receive input code that includes one or more input objects. The input code may be used in connection with generation of output code. The output code, when generated, may include one or more output objects, corresponding to and different than the one or more input objects. The device may receive or determine conversion information identifying a conversion operation to perform to generate the one or more output objects based on the one or more input objects. The conversion information may be received separately from the input code. The device may generate, based on the conversion information and the input code, an intermediate representation. The intermediate representation may include one or more annotations corresponding to the one or more input objects and defining the conversion operation. The device may compile, based on the intermediate representation, the output code. The device may execute or provide the output code.

23 Claims, 9 Drawing Sheets

(56) References Cited

U.S. PATENT DOCUMENTS

| | | | | |
|---|---|---|---|---|
| 6,502,237 | B1* | 12/2002 | Yates | G06F 9/45516 717/136 |
| 6,968,544 | B1* | 11/2005 | Schneider | G06F 9/4428 707/999.102 |
| 7,720,939 | B1* | 5/2010 | Leroy | G06F 9/44589 709/220 |
| 2005/0010891 | A1* | 1/2005 | Chaiken | G06F 8/52 717/100 |
| 2005/0065990 | A1* | 3/2005 | Allen | G06F 9/45504 708/495 |
| 2007/0260571 | A1* | 11/2007 | Mansfield | G06F 17/227 706/48 |
| 2007/0283358 | A1* | 12/2007 | Kasahara | G06F 9/5044 718/104 |
| 2008/0022264 | A1* | 1/2008 | MacKlem | G06F 8/34 717/136 |
| 2008/0235672 | A1* | 9/2008 | Lozano | G06F 8/4442 717/140 |
| 2009/0164973 | A1* | 6/2009 | Barnett | G06F 8/41 717/110 |
| 2009/0167959 | A1* | 7/2009 | Nakamura | H04N 19/56 348/699 |
| 2010/0131934 | A1* | 5/2010 | Kim | G06F 17/5045 717/137 |
| 2011/0093837 | A1* | 4/2011 | Guenthner | G06F 8/45 717/149 |
| 2012/0290587 | A1* | 11/2012 | Peyton | G06F 8/34 707/749 |
| 2014/0282443 | A1 | 9/2014 | Hoban et al. | |
| 2015/0294114 | A1* | 10/2015 | Monahan | G06F 8/41 726/26 |
| 2016/0063236 | A1* | 3/2016 | Masuko | G06F 21/31 726/18 |
| 2016/0124727 | A1* | 5/2016 | Trojahner | G06F 8/49 717/143 |
| 2017/0220572 | A1* | 8/2017 | Ding | G06F 17/30032 |

OTHER PUBLICATIONS

Klint et al., "RASCAL: A Domain Specific Language for Source Code Analysis and Manipulation", 2009 Ninth IEEE International Working Conference on Source Code Analysis and Manipulation, Sep. 20, 2009, pp. 168-177, XP031542333.

Sujeeth et al., "Delite: A Compiler Architecture for Performance-Oriented Embedded Domain-Specific Languages", ACM Transactions on Embedded Computing Systems, vol. 13, No. 4s, Article 134, Mar. 2014, pp. 1-25, XP055187083.

Notification of Transmittal of the International Search Report and the Written Opinion of the International Searching Authority, or the Declaration, corresponding to PCT/US2016/035455, dated Aug. 30, 2016, 14 pages.

* cited by examiner

```
Input code:
%#codegen
function [y_out, delayed_xout] = mlhdlc_sfir(x_in, h_in1, h_in2, h_in3, h_in4)
                                                    ⎵_____⎵
                                                                   405

% declare and initialize variables
persistent ud1 ud2 ud3 ud4 ud5 ud6 ud7 ud8;
if isempty(ud1)
    ud1 = 0; ud2 = 0; ud3 = 0; ud4 = 0; ud5 = 0; ud6 = 0; ud7 = 0; ud8 = 0;
end                                          ⎵_____⎵
% access the previous value of states/registers        410
a1 = ud1 + ud8;  a2 = ud2 + ud7;
a3 = ud3 + ud6;  a4 = ud4 + ud5;

m1 = h_in1 * a1; m2 = h_in2 * a2;
m3 = h_in3 * a3; m4 = h_in4 * a4;

. . .

codegen -args {0, 0, 0, 0, 0} mlhdlc_sfir -singleC  ~415
```

FIG. 4A

TECHNICAL COMPUTING ENVIRONMENT (TCE)
File  Edit  Tools  View  Execute

Intermediate representation (with annotations)

```
CFG: Not marked any of CORE, CLASSIC, or DOM_CPP
start0:
  start
  /*_declare_and_initialize_variables*/
  #global()
  #if((@%isempty) v[@%ud1]) goto [merge1_]
  #codeBlock()
  %ud1 = $annotatex($0);
  %ud2 = $annotatex($0);
  %ud3 = $annotatex($0);
  %ud4 = $annotatex($0);    } 420
  %ud5 = $annotatex($0);
  %ud6 = $annotatex($0);
  %ud7 = $annotatex($0);
  %ud8 = $annotatex($0);
```

FIG. 4B

```
Output code (C language)
13  static float ud1;
14  static float ud2;
15  static float ud3;
16  static float ud4;      425
17  static float ud5;
18  static float ud6;
19  static float ud7;
20  static float ud8;
21
22  /*
23   * Arguments : float x_in
24   *             float h_in1
25   *             float h_in2
26   *             float h_in3      430
27   *             float h_in4
28   *             float *y_out
29   *             float *delayed_xout
30   * Return Type : void
31   */
32  void mlhdlc_sfir(float x_in, float h_in, float h_in1, float h_in2, float h_in3, float h_in4
33                   float *y_out, float *delayed_xout)
```

```
TECHNICAL COMPUTING ENVIRONMENT (TCE)                          _ □ X
File   Edit   Tools   View   Execute
Function dut
1  function {out} = dut(in)
2      a = exfc(in);
3      b = sin(in);
4      [c, d] = hist(in);
5      out = a + b + c + d;
6  end
```

| Summary | All Messages (4) | Variables | Target Build Log |
|---|---|---|---|
| Order | Type | Function | Line | Description |
| 1 | ⚠ | dut | 1 | The target compiler produced warnings. See the target build log for further details. —440 |
| 2 | ⚠ | dut | 2 | The built-in function exfc is implemented in double-precision. Code generated for —445 this function will contain doubles. |
| 3 | ⚠ | dut | 3 | The function sin uses double-precision in the C89/C90 (ANSI) standard. For single- —450 precision code, consider using the C99 (ISO) standard or use your own function |
| 4 | ⚠ | dut | 4 | Output 1 of built-in function hist is double-precision and has been cast to single- —455 precision. The code generated for the built-in function may still contain doubles. |

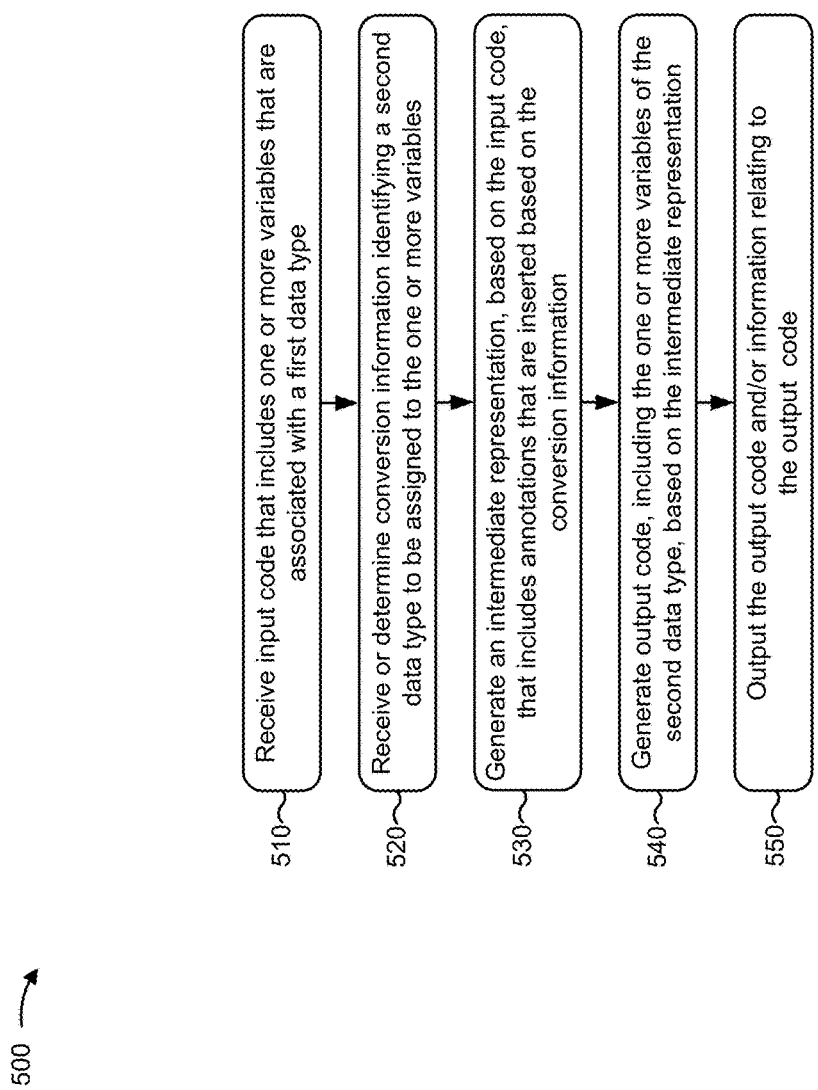

DATA TYPE REASSIGNMENT

RELATED APPLICATION

This application claims priority under 35 U.S.C. § 119 to U.S. Provisional Patent Application No. 62/170,427, filed on Jun. 3, 2015, the content of which is incorporated by reference herein in its entirety.

BRIEF DESCRIPTION OF THE DRAWINGS

FIGS. 4A-4D are diagrams of an example implementation of converting variable data types in program code; and FIG. 5 is a flow chart of an example process for reassigning data types for program code.

DETAILED DESCRIPTION

Figure 1A:
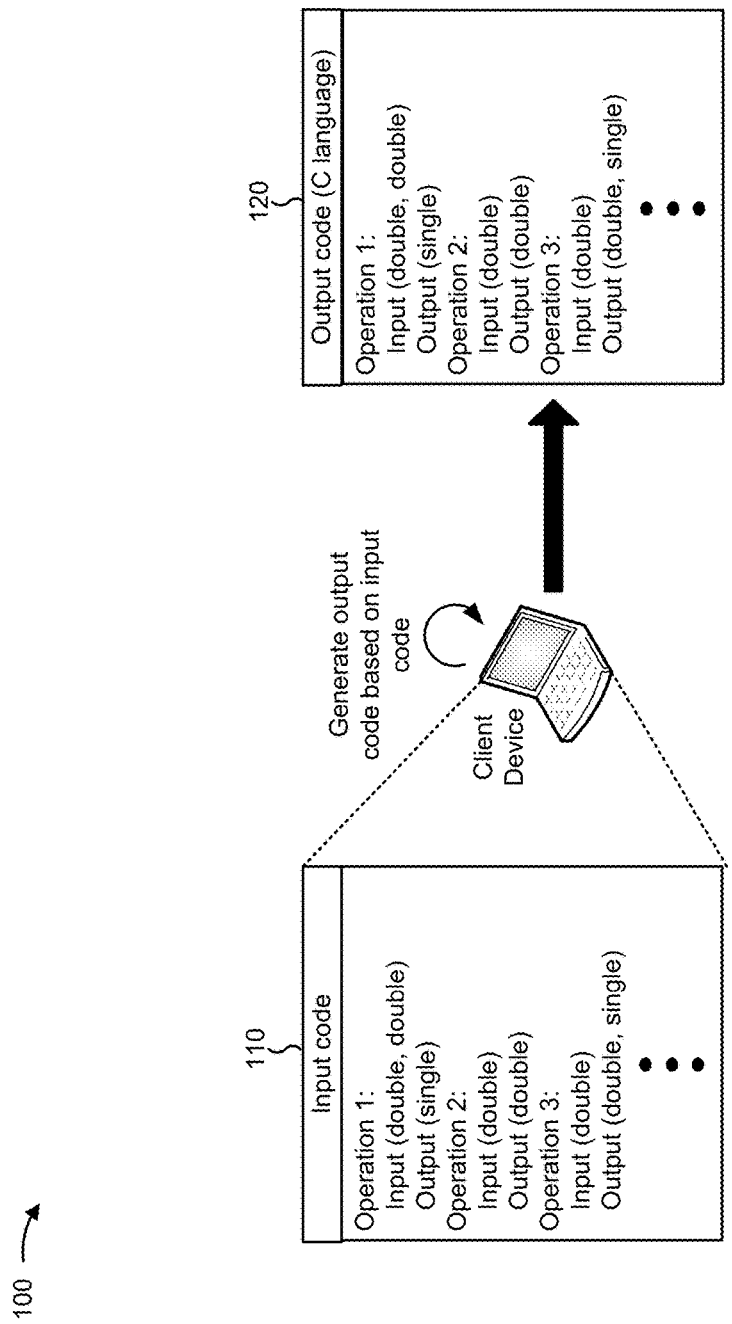
FIGS. 1A and 1B are diagrams of an overview of an example implementation described herein.

The following detailed description of example implementations refers to the accompanying drawings. The same reference numbers in different drawings may identify the same or similar elements.

Program code may include a variety of variables. Each variable, of the variety of variables, may be associated with a data type that indicates a size and/or layout of memory that is used, for example, to store a value associated with the variable. For example, the data type may include a floating point data type, such as a double-precision data type, a single-precision data type, or the like. As another example, the data type may include an integer data type, such as a signed integer data type (e.g., associated with a particular quantity of memory, such as 8 bits, 16 bits, 32 bits, 64 bits, etc.), an unsigned integer data type (e.g., associated with a particular quantity of memory, such as 8 bits, 16 bits, 32 bits, 64 bits, etc.), or the like. In some programming environments, a variable may be assigned a default data type. For example, in a particular programming environment, a newly created variable may be assigned a double-precision data type by default.

Certain data types may be preferable in certain situations. For example, a device may conserve processor power, memory, etc. by assigning a single-precision data type to a particular variable, as compared to assigning a double-precision data type to the particular variable. As another example, a hardware component (e.g., a processor, etc.) may be adapted to process variable values of a single-precision data type, and may not be adapted to process variable values of a double-precision data type. Therefore, a device may benefit from reassigning a variable from a first data type to a second data type.

However, variables of different data types may be processed in different fashions, which may cause difficulty in reassigning data types of the variables. Implementations described herein may enable a device to reassign a variable from a first data type in input code to a second data type in output code in a fashion that does not require manual generation of program code including the second data type by the user. To reassign the variable's data type, the device may associate an annotation, describing the second data type, with the variable in an intermediate representation that is generated based on the input code. In this way, a device hosting a programming environment conserves processor power and improves efficiency by reassigning data types.

Implementations described herein may enable the device to modify other aspects of input code using annotations in the intermediate representation. For example, an annotation may identify an operation that can be substituted in output code for another operation in input code. As another example, the device may use annotations to iteratively test output code. For example, a particular annotation may cause the device to select a data type for a variable based on information stored at a location, and the device may update the information for multiple executions of the output code to test different data types. In this way, the device facilitates iterative testing of output code using different data types, which conserves processor and storage resources that are otherwise used to execute code with sub-optimal data types.

In some implementations, an annotation may be specified and/or applied before or after generation of the intermediate representation (i.e., before or after inference). Furthermore, an annotation may be applied to an object at any level of hierarchy of a program (e.g., a data type, a local variable, a global variable, a temporary variable, a function, an expression, a line of code, a subroutine, a program, etc.). For example, an annotation may be specified at any level of hierarchy, and the annotation may cause an effect in other levels of hierarchy and/or in other portions of the program code (e.g., based on a change to a variable data type, a change to a function, a change to a variable value, etc.).

Still further, an annotation may be specified based on an instruction, and need not be hardcoded into the program code. In this way, implementations described herein enable manipulation of program code at different levels of abstraction based on annotations that are applied in the intermediate representation and/or the output code. These annotations may be specified in the input code, or may be specified "on the fly" based on receiving an instruction or based on another annotation in the intermediate representation.

Figure 1B:
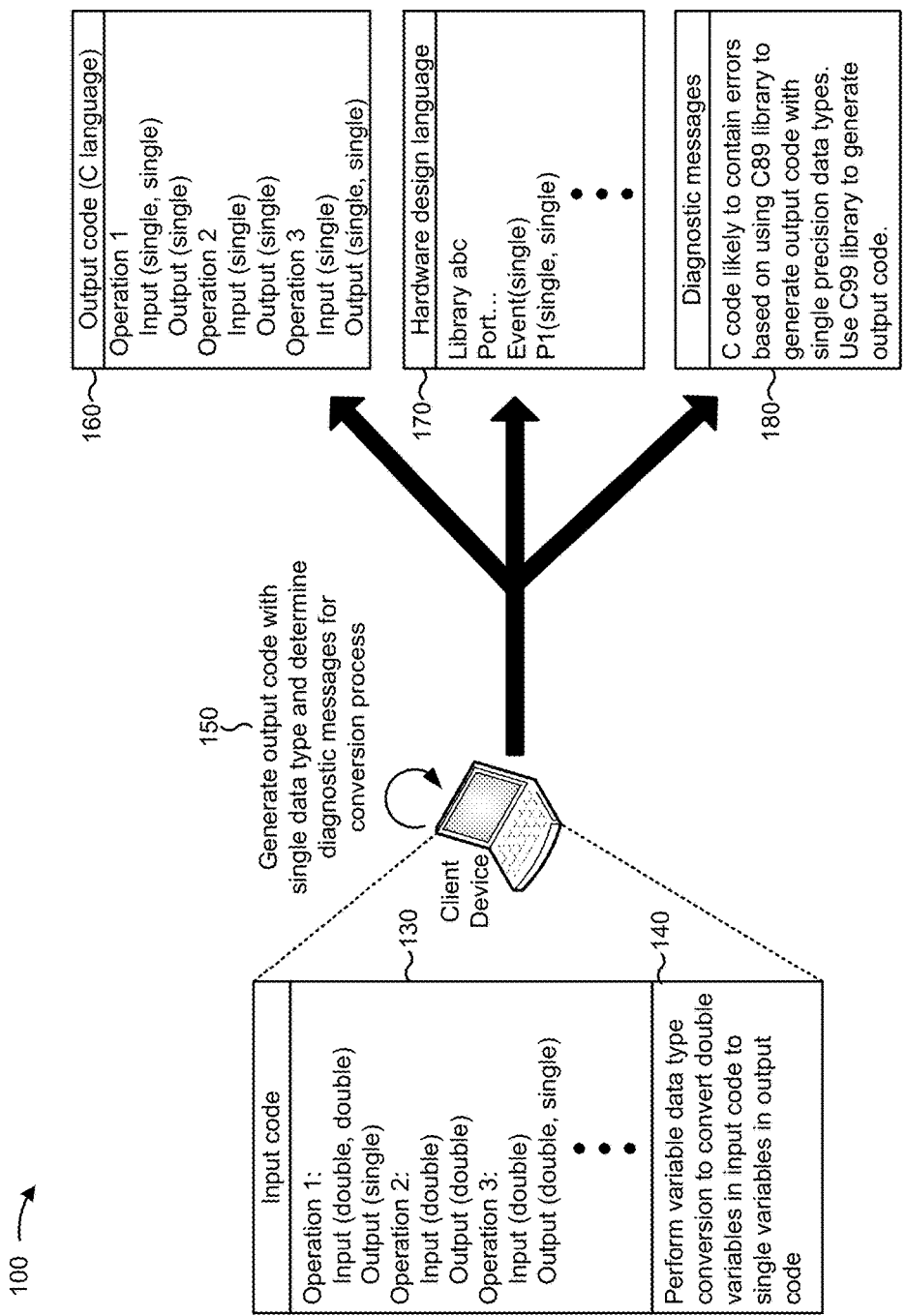

FIGS. 1A and 1B are diagrams of an overview of an example implementation 100 described herein. FIG. 1A shows an example of generating output code based on input code without converting data types of variables included in the input code. As shown in FIG. 1A, and by reference number 110, a client device may receive input code (e.g., based on a user input, based on obtaining the input code from memory, etc.). The input code specifies operations (e.g., Operation 1, Operation 2, Operation 3, and so on) that are associated with variables (e.g., input variables and output variables). Here, each variable is associated with one of two data types: a single-precision data type (e.g., associated with 32-bit storage locations) or a double-precision data type (e.g., associated with 64-bit storage locations). In some implementations, the variables may be associated with other data types, such as a quadruple-precision data type (e.g., associated with 128-bit storage locations), a data type associated with 40-bit storage locations, an integer data type, or the like.

As shown by reference number 120, the client device may generate output code based on the input code. In some implementations, the output code may be in a different programming language than the input code. For example, here, the output code is in the C programming language. Assume that the input code is in a programming language associated with a programming environment executed on the client device. In other cases, the output code may be in the same programming language as the input code, may be in multiple, different programming languages, or the like. As shown, the output code includes variables with the same data types as variables included in the input code. For example, in the output code, two inputs to Operation 1 are associated with double-precision data types, and an output of Operation 1 is associated with a single-precision data type, as in the input code.

However, if the C programming language is not adapted to handle particular data types (e.g., if a particular library used to generate the output code does not include functions configured for the particular data types), the output code may produce unexpected and/or inaccurate results when executed. Further, a user may want to generate multiple, different iterations of the output code with variables of different data types (e.g., for quality assurance, etc.) and/or in different programming languages (e.g., that may not be adapted for variables of certain data types) without manually generating program code with the variables of different data types and/or in different programming languages.

FIG. 1B shows an example of generating output code in multiple, different programming languages with specified variable data types. As shown in FIG. 1B, and by reference number 130, the client device receives input code (e.g., the same input code as described in connection with FIG. 1A). As shown by reference number 140, the client device determines to perform variable data type conversion to convert double-precision variables in the input code to single-precision variables in output code. Assume that the client device receives an instruction to cause the client device to perform the variable data type conversion, and assume that the instruction identifies target programming languages of C and hardware design language (HDL) for the output code.

As shown by reference number 150, the client device generates output code with a single-precision data type and determines diagnostic information relating to the conversion process. For example, the client device may generate an intermediate representation based on the input code and based on conversion operations to be performed with regard to the input code, and may generate the output code based on annotations corresponding to the conversion operations in the intermediate representation, as described in more detail elsewhere herein.

As shown by reference number 160, the client device may generate output code in the C programming language. As shown, the client device may generate the output code to include variables of a single-precision data type. In some cases, the client device may replace operations (e.g., some of or all of Operations 1 through 3) with different operations to generate the output code. For example, if an operation in the target programming language (e.g., C) is not compatible with the single-precision data type, the client device may replace the operation with an operation that is compatible (e.g., from a different library associated with the target programming language, etc.).

As shown by reference number 170, the client device may generate output code in HDL. By converting the double-precision data type variables of the input code to single-precision data type variables, the client device can generate the HDL code, thus saving processor resources and programmer time that is otherwise used to convert the double-precision data type variables to single-precision data type variables. For example, a processor may execute HDL code, and may be incapable of handling double-precision data type variables. In this way, the client device facilitates generation of the HDL program in a fashion that the processor can execute.

As shown by reference number 180, the client device may generate diagnostic messages based on generating the output code. Here, the client device provides a diagnostic message indicating that the output code (e.g., the C language output code identified by reference number 160) is likely to contain errors based on using a C89 library (e.g., the American National Standards Institute (ANSI) 1989 library) to generate output code with single-precision variables. As further shown, the client device suggests using a C99 library (e.g., the ISO/IEC 9899:1999 C programming language standard), which is configured for single-precision data types, to generate the output code. In this way, the client device conserves processor resources and reduces errors associated with generating output code, and conserves user time and resources that are otherwise used to generate output code with single-precision variables.

Implementations described herein are described with regard to textual programming languages. However, implementations described herein are not limited to textual programming languages, and may be applied equally for other types of programming languages (e.g., graphical programming languages, etc.).

Figure 2:
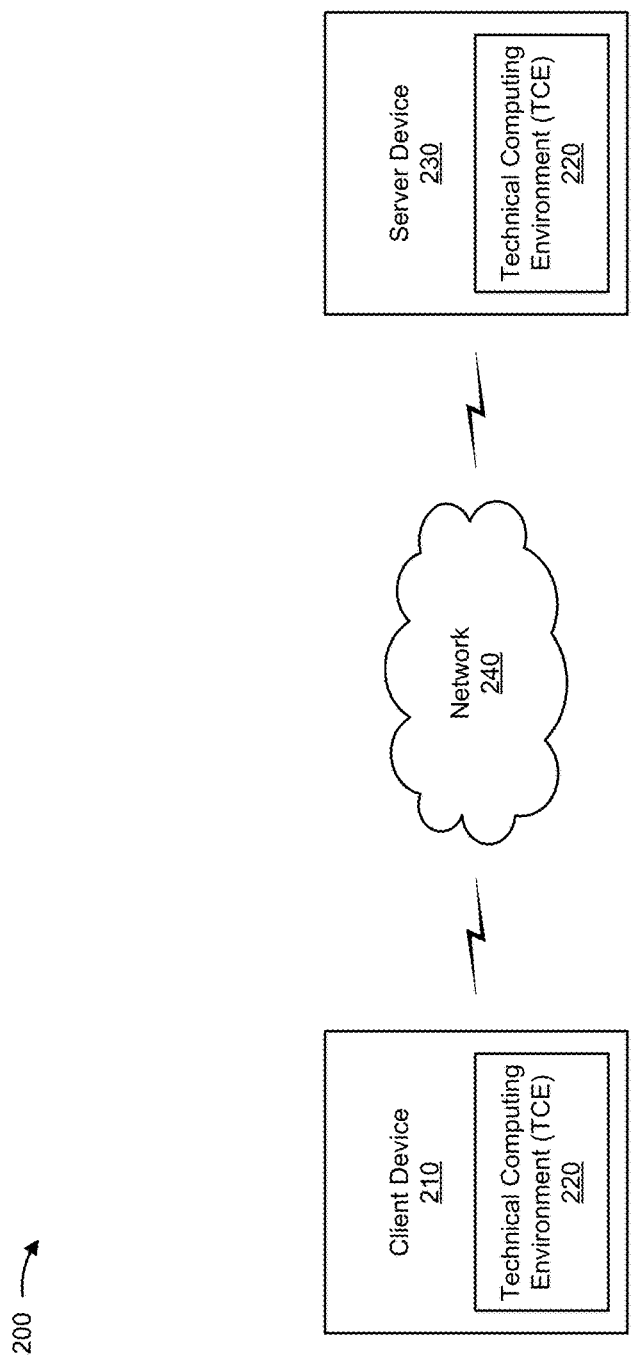
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing program code and/or information associated with program code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 220 may include a user interface for providing information to a user and/or receiving information from the user (e.g., program code, diagnostic messages, user interactions, etc.).

Server device 230 may include one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
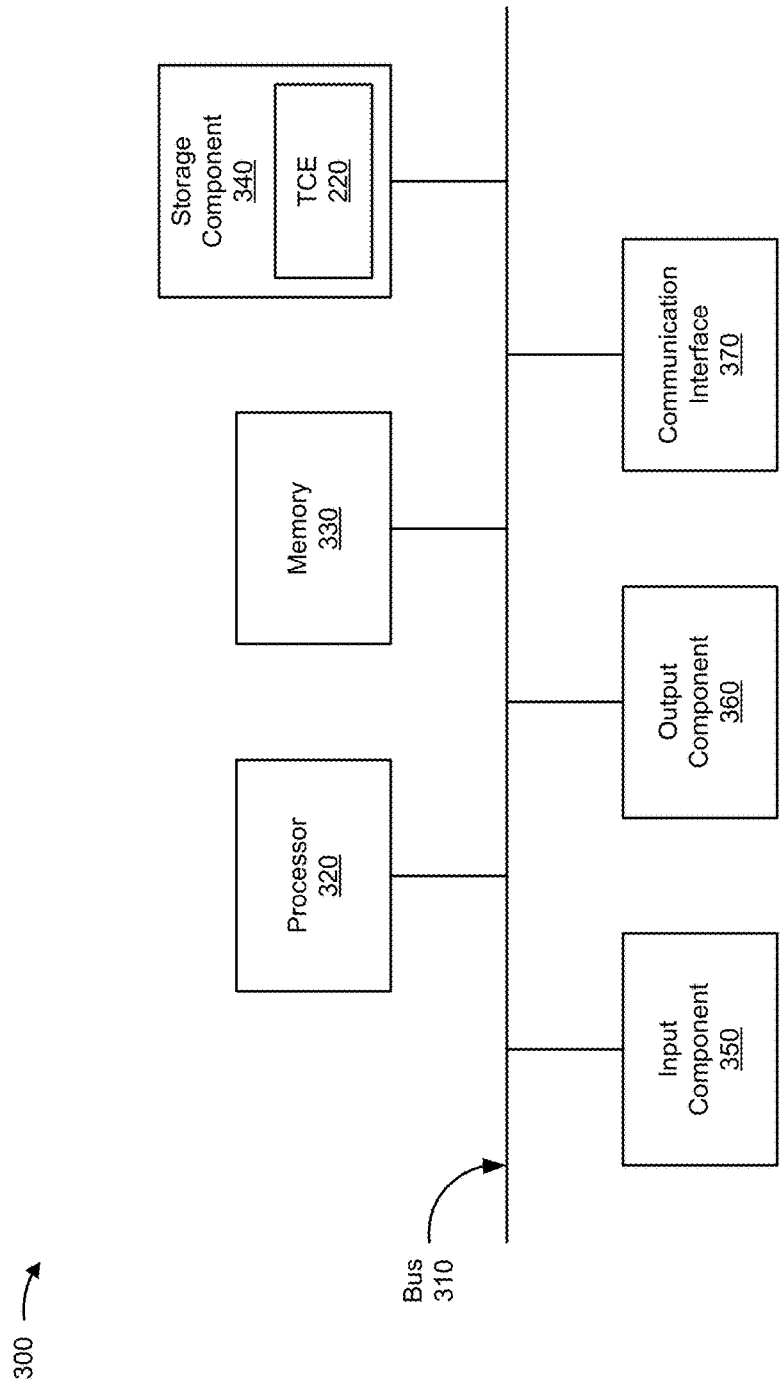
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of converting variable data types in program code.

As shown in FIG. 4A, client device 210 (e.g., TCE 220) may receive input code. Here, the input code defines a function of mlhdlc_sfir. As shown by reference number 405, the function receives inputs that are associated with input variables of x_in, h_in1, h_in2, h_in3, and h_in4. As further shown, the function outputs values that are assigned to variables of y_out and delayed xout. As shown by reference number 410, the function declares and initializes variables of ud1 through ud8, and assigns the variables values of 0 if the variables are not already associated with values. Assume that TCE 220, by default, assigns double-precision data types to initialized variables. Thus, variables ud1 through ud8 are all assigned double-precision data types. As further shown, the function performs operations using the variables of ud1 through ud8 and the input variables.

As shown by reference number 415, client device 210 may receive an instruction (e.g., codegen) to generate output code based on the input code of mldhlc_sfir. As shown, the codegen instruction includes arguments of {0, 0, 0, 0, 0}. The arguments cause client device 210 to generate output code using integer data types for x_in, h_in1, h_in2, h_in3, and h_in4. As further shown, the codegen instruction includes an argument of –singleC. Here, the argument of –singleC is conversion information that indicates to convert variables of the input code to the single-precision data type in the C programming language. For example, client device 210 may store information associating arguments with conversion information. As another example, client device 210 may determine the conversion information based on syntax of the argument of –singleC. For example, based on the argument containing a string of "single," client device 210 may determine that variables of the input code are to be converted to the single precision data type, and based on the argument containing a value of "C," client device 210 may determine that variables of the input code are to be converted based on the C programming language. Based on the argument of –singleC, client device 210 may generate output code in the C programming language using single-precision data types for variables in the output code.

FIG. 4B shows an example of a portion of an intermediate representation that may be generated based on the input code and the instruction shown in FIG. 4A. Client device 210 may use the intermediate representation to generate output code. For example, the intermediate representation may be a representation of the input code (e.g., a structure of the input code, an abstract syntax tree generated based on the input code, a translation of the input code to another programming language, etc.) that client device 210, or another device, uses to generate output code. By generating an intermediate representation based on the input code, client device 210 simplifies generation of output code, thereby conserving processor resources. For example, using an intermediate representation to generate output code increases uniformity of information used to generate the output code and thereby increases a variety of programs, devices, etc. that can generate output code.

As shown in FIG. 4B, and by reference number 420, the intermediate representation may include annotations (e.g., % ud1=$annotatex($0); etc.) corresponding to variables in the input code. Client device 210 may insert an annotation corresponding to a variable in the intermediate representation based on conversion information associated with the variable. Here, since the conversion information determined in connection with FIG. 4A indicates to generate output code with single-precision variables, client device 210 inserts annotations corresponding to the variables of ud1, ud2, and the like. In some implementations, client device 210 may insert annotations for other variables of the input code (e.g., x_in, h_in1, h_in2, h_in3, h_in4, etc.) (not shown).

The annotation may cause client device 210 to generate output code that includes variables of the single-precision data type. For example, the annotation may include information that causes client device 210, when parsing the annotation to generate the output code, to generate output code using single-precision data types. Here, the annotation includes "($0)," which causes client device 210 to generate output code using single-precision data types. Thus, using the intermediate representation and the annotation, client device 210 may generate output code, for the input code, in several different programming languages.

FIG. 4C shows an example of output code in the C programming language that may be generated based on the intermediate representation, including the annotations. As shown in FIG. 4C, and by reference number 425, the output code defines the variables of ud1 through ud8 as float (e.g., a single-precision floating point data type, as opposed to a double-precision floating point data type, which would be defined by a string of double). As shown by reference number 430, client device 210 defines input and output arguments of the function of mlhdlc_sfir as single-precision floating point data type variables. In some implementations, client device 210 may replace operations, expressions, or the like, of the function of mlhdlc_sfir to improve compatibility with single-precision data types, as described in more detail elsewhere herein.

In this way, client device 210 (e.g., TCE 220) generates output code using single-precision data type variables based on input code that uses double-precision data type variables, which saves time and processor resources that are otherwise used to generate the output code. Further, by generating the output code with single-precision data types, client device 210 may save processor resources and/or storage resources of devices that execute the output code, and may increase a variety of devices that can execute the output code.

FIG. 4D shows an example of diagnostic messages that may be generated based on conversion operations to be performed by client device 210. For the purpose of FIG. 4D, assume that client device 210 receives input code defining a function of dut, and assume that client device 210 receives an instruction to generate output code with single-precision data types in the C programming language based on the dut function. The diagnostic messages may identify variables that are to be converted to a different data type, may identify expressions and/or operations that are likely to cause an error based on an output data type, may identify expressions and/or operations that have been replaced in output code, may indicate whether a result of executing output code matches a result of executing input code, or the like. Here, the diagnostic messages relate to generating output code based on the dut function.

As shown by reference number 440, client device 210 may provide a first diagnostic message indicating that a target compiler (e.g., a C compiler) produced warnings when compiling the output code. As shown by reference number 445, client device 210 may provide a second diagnostic message indicating that an expression in the input code (e.g., exfc) is implemented using double-precision data types, and indicating that code generated for the exfc expression will contain double-precision data types. Assume that client device 210 determines that no suitable single-precision expression can replace the exfc expression, and therefore generates the second diagnostic message.

As shown by reference number 450, client device 210 may provide a third diagnostic message indicating that an expression (e.g., sin) uses double-precision in a particular library (e.g., the C89/C90 library), and may suggest another library to use (e.g., the C99 library) based on a sin function of the other library being compatible with the single-precision data type. In this way, client device 210 improves reliability of output code and conserves time and processor resources that are otherwise used to execute and debug improperly-typed output code. As shown by reference number 455, client device 210 may provide a fourth diagnostic message indicating that an output of an expression (e.g., hist) is associated with a double-precision data type, and has been assigned a single-precision data type based on the conversion information. In this way, client device 210 provides diagnostic messages based on a conversion process, which enables a user to troubleshoot issues with output code, determine which conversion operations are successfully performed, select an appropriate library for generating output code, or the like.

As indicated above, FIGS. 4A-4D are provided merely as an example. Other examples are possible and may differ from what was described with regard to FIGS. 4A-4D.

FIG. 5 is a flow chart of an example process 500 for converting variable data types in program code. In some implementations, one or more process blocks of FIG. 5 may be performed by client device 210. In some implementations, one or more process blocks of FIG. 5 may be performed by another device or a group of devices separate from or including client device 210, such as server device 230.

As shown in FIG. 5, process 500 may include receiving input code that includes one or more variables that are associated with a first data type (block 510). For example, client device 210 (e.g., TCE 220) may receive input code. In some implementations, client device 210 may receive the input code based on a user input (e.g., based on a user inputting the input code, etc.), may obtain the input code from storage (e.g., from local storage, from server device 230, based on a user input specifying a location at which the input code is stored, etc.), may download the input code from a web server, or the like. Client device 210 may receive the input code to generate output code based on the input code and based on conversion information relating to objects (e.g., variables, expressions, etc.) in the input code.

The input code may include objects (e.g., variables, expressions, etc.) that may be converted to a different data type, replaced with a different operation, or the like, upon generation of corresponding output code. For example, in some cases, the input code may include one or more variables that are associated with a first data type. In some implementations, each variable of the input code may be associated with the same data type. In other cases, variables of the input code may be associated with different data types. Additionally, or alternatively, the input code may include other objects, such as expressions, operators, primitives, data classes, or the like, as described in more detail elsewhere herein.

In some implementations, client device 210 may determine data types of one or more variables in the input code. In some cases, client device 210 may determine data types of the one or more variables based on information associated with the one or more variables. For example, a user may input information in association with the variables (e.g., flags, etc.) identifying the data types. As another example, client device 210 may determine the data types based on information included in the input code. For example, the input code may include information defining the data types of the one or more variables (e.g., based on a variable class, an argument of a function, etc.).

In some implementations, client device 210 may determine data types of the one or more variables based on operations associated with the variables. For example, if a variable in a particular programming language is outputted by an operation that outputs double-precision data type variables, client device 210 may determine that the variable is associated with the double-precision data type. In some implementations, client device 210 may determine a data type of a variable based on a default rule. For example, a particular programming environment (e.g., TCE 220) may generate variables of a particular data type based on a default rule, and client device 210 may determine the data type of variables generated in the particular programming environment based on the default rule.

As further shown in FIG. 5, process 500 may include receiving or determining conversion information identifying a second data type to be assigned to the one or more variables (block 520). For example, client device 210 (e.g., TCE 220) may receive or determine conversion information pertaining to the one or more variables of the input code. The conversion information may identify a second data type to be assigned to the one or more variables. As one possible example, the one or more variables of the input code may be associated with a double-precision data type, and the conversion information may indicate that the one or more variables in corresponding output code are to be associated with another data type (e.g., a single-precision data type, an integer data type, etc.), as shown in FIGS. 4A-4C. In some implementations, client device 210 may determine conversion information relating to other objects in the input code, as described in more detail below.

In some implementations, client device 210 may receive information that identifies the conversion information. For example, client device 210 may receive input code, and may receive an instruction to convert variables of the input code from a first data type to a second data type, as shown in FIG. 4A. As another example, client device 210 may receive a function call with information indicating that variable values outputted by the function are to be outputted in a particular data type. In some implementations, client device 210 may receive a specification that includes conversion information for multiple, different variables. The specification may identify particular variables (e.g., based on names of the particular variables, locations of the particular variables, whether the particular variables are inputs of a functions and/or outputs of a function, etc.) and may identify data types to be assigned to the particular variables in output code.

In some implementations, client device 210 may receive conversion information identifying a custom data type. As one possible example, assume that client device 210 receives the following program code:
    types('mlhdlc_sfir.x')=numerictype(1, 16, 14);
The above program code includes a function (e.g., "numerictype") that may specify a custom data type for a variable x that is included in a script named "mlhdlc_sfir." The custom data type may be a signed data type (e.g., based on the numerictype function including a first argument of "1") that is associated with 16 bits of storage (e.g., based on the numerictype function including a second argument of "16"), of which 14 bits are fractional (e.g., based on the numerictype function including a third argument of "14"). Other examples of conversion information are possible, and implementations described herein are not limited to the above example of conversion information.

In some implementations, client device 210 may determine conversion information based on the input code and/or based on output code to be generated from the input code. For example, if output code is to be generated in a particular programming language, client device 210 may determine conversion information based on data types associated with the particular programming language (e.g., to improve performance in the particular programming language, to make one or more operations compatible with the particular programming language, etc.). As another example, if client device 210 is to use a particular library to generate output code, client device 210 may determine conversion information to cause variables to be converted to a data type with which the particular library is compatible.

Additionally, or alternatively, client device 210 may determine conversion information for a first object based on a second object. For example, if a variable that is inputted to a function is associated with a particular data type, and if the function is incompatible with the particular data type, client device 210 may determine conversion information to replace the function with another function that is compatible with the particular data type. In this way, client device 210 reduces errors related to converting data types and improves reliability of output code.

In some implementations, client device 210 may determine conversion information based on a context in which a variable is used. For example, assume that a variable in input code is assigned a double-precision data type and is used in an indexing context (e.g., is used to store integer index values). In that case, client device 210 may determine that the variable is used in the indexing context (e.g., based on operations that receive the variable as input or output the variable, values stored by the variable, etc.), and may determine conversion information based on the variable being used in the indexing context (e.g., may cause the variable to be converted to a single-precision data type, since a single-precision data type variable is sufficiently accurate for indexing operations). In this way, client device 210 determines conversion information for variables based on context of the variables, thereby conserving processor and storage resources that are otherwise used to process variables associated with sub-optimal data types.

In some implementations, client device 210 may determine conversion information to conserve processor resources and/or storage resources. For example, signed variables of a particular length may use more processor and/or storage resources than unsigned variables of the particular length, and variables associated with fewer bits (e.g., variables of shorter length) may use less processor and/or storage resources than variables associated with more bits (e.g., variables of longer length). Conversion information, for a set of variables, may indicate whether each variable, of the set of variables, is to be signed or unsigned, and may identify a length of each variable. Client device 210 may configure the lengths and signs of the set of variables to conserve processor and/or storage resources. For example, client device 210 may use a shortest length that achieves a threshold accuracy with regard to an output, may not use signed variables when signed variables are unnecessary, or the like, as described in more detail below. In this way, client device 210 conserves storage resources and processing resources.

In some implementations, client device 210 may determine conversion information for an object other than a variable. For example, client device 210 may determine that a first expression in input code is to be replaced with a second expression in output code (e.g., based on a user input, based on a default rule, based on locally stored information identifying the first expression and the second expression, etc.). In such a case, client device 210 may determine conversion information identifying the first expression and the second expression, and may generate an intermediate representation that includes an annotation based on the conversion information, as described in more detail below. In this way, client device 210 can replace expressions with different expressions during compilation or runtime, which permits client device 210 to improve performance and/or accuracy of the output code, as also described in more detail below.

In some implementations, client device 210 may determine diagnostic information based on the conversion information. For example, assume that client device 210 (e.g., TCE 220), by default, generates program code according to the ANSI C programming language standard, which specifies to use double-precision data types. Assume further that client device 210 receives an indication to generate output code, in the C programming language, with variables of a single-precision data type. In that case, client device 210 may generate one or more diagnostic messages for a user, as described in more detail in connection with FIG. 4C. For example, client device 210 may identify another programming language standard that may support the single-precision data type (e.g., the ISO/IEC 9899:1999 C programming language standard, etc.). Based on the identified programming language standard, client device 210 may receive an interaction to select the identified programming language standard as the default standard, for example, when generating output code in the C programming language. In this way, client device 210 improves reliability of program code and conserves processor resources that may otherwise be used to generate and/or execute code with improperly typed variables.

As further shown in FIG. 5, process 500 may include generating an intermediate representation, based on the input code, that includes annotations that are inserted based on the conversion information (block 530). For example, client device 210 (e.g., TCE 220) may generate an intermediate representation based on the input code, as described in more detail in connection with FIG. 4B, above.

Client device 210 may generate an intermediate representation in the form of a data structure that is stored in memory, a file, a database, or any other acceptable storage medium. The intermediate representation may be constructed from input data contained within input code and from which part or all of the target language information (e.g., output code) is constructed. An intermediate representation may identify elements (e.g., variables, expressions, objects, etc.) of the input code to be converted, and may describe how to convert the elements in order to generate the output code. For example, client device 210 may receive human-readable input code, and may generate an intermediate graph structure identifying data flows in the input code. The content of an intermediate representation may be derived from, for example, elements in input code, optimization rules (e.g., rules for combining elements, rules for identifying redundant elements, rules for rearranging elements to improve efficiency of output code generation and/or execution, etc.), conversion information, or the like.

As one example, referring to FIG. 4A, the expression "if isempty(ud1)" corresponds to content of the intermediate representation shown in FIG. 4B (e.g., "#if((@%isempty) v[@%ud1]) goto [merge1_]"). The content of the intermediate representation may identify a path of data through the input code when the input code is executed. For example, when the program code is executed, execution may begin at the "start0:" portion of the intermediate representation, and may proceed to the "#codeblock" portion of the intermediate representation, assuming that the "isempty ud1" condition is true. When the "isempty ud1" condition is false, execution may proceed to the "merge1_" portion of the intermediate representation (not shown). Thus, the intermediate representation identifies data flow in execution of the program code, and permits rearrangement and/or improvement (e.g., optimization) of input code when generating output code.

When generating an intermediate representation, client device 210 may use transformation rules. Transformation rules, for example, may determine how an element in input code is represented in the intermediate representation or in output code. For example, there may be a transformation rule relating to an element of input code for transforming the element into a section of the intermediate representation. Moreover, there may be another transformation rule for transforming the section of the intermediate representation into output code. The transformation rules may exist on a non-transitory computer readable medium and may be contained in a file, database, repository, or some other structure.

The intermediate representation may include annotations corresponding to objects that are to be converted in output code (e.g., variables, expressions, etc. that are associated with conversion information). An annotation may identify a conversion operation to be performed with regard to one or more objects when generating output code based on input code corresponding to the one or more objects. For example, in some implementations, an annotation may identify a particular data type to be assigned to a variable based on a name of the particular data type (e.g., single, double, float, integer, etc.). As another example, an annotation may include information defining a data type for a variable based on whether the variable is to be signed or unsigned, a quantity of bits to use for an integer portion of the variable, a quantity of bits to use for a fractional portion of the variable, or the like.

In some implementations, an annotation may be associated with a particular expression in the intermediate representation. For example, the annotation may define another expression with which to replace the particular expression, may define one or more operations to perform in conjunction with (e.g., simultaneously with, before, after, based on an output of, in place of, etc.) the particular expression, may identify a rounding operation to perform on an output of the particular expression, or the like. The intermediate representation may include information defining the particular expression and/or may include an annotation associated with the particular expression that defines the one or more operations. For example, the annotation may replace the particular expression in the intermediate representation, may be appended to the particular expression in the intermediate representation, may precede the particular expression in the intermediate representation, or the like.

Client device 210 may insert annotations in the intermediate representation based on conversion information received in association with or determined based on the input code. For example, when generating the intermediate representation based on input code, client device 210 may determine that a particular input object (e.g., variable, operation, etc.) in the input code is associated with conversion information (e.g., conversion information input by a user, conversion information determined by client device 210, etc.). Based on determining that the particular input object is associated with conversion information, client device 210 may insert an annotation in the intermediate representation corresponding to the particular input object. In some implementations, client device 210 may receive conversion information specifying an annotation as an intermediate representation is generated, and may insert the annotation in the intermediate representation based on the conversion information.

As further shown in FIG. 5, process 500 may include generating output code, including the one or more variables of the second data type, based on the intermediate representation (block 540). For example, client device 210 may generate output code, including the one or more variables of the second data type, based on the intermediate representation. Additionally, or alternatively, the output code may include objects, other than the one or more variables, that have been converted based on conversion information, such as expressions, operators, or the like.

In some implementations, the output code may be in the same programming language as the input code. Additionally, or alternatively, the output code may be in a different programming language than the input code. As possible examples, the input code and/or the output code may be in C, C++, C#, Ada, Java, hardware design language (HDL), or another programming language. In some implementations, client device 210 may generate multiple, different output code files in multiple, different programming languages and/or for multiple, different execution environments. In some implementations, client device 210 may generate interleaved output code. For example, the interleaved output code may have one or more lines of code or objects corresponding to a first intermediate representation with first annotations, and one or more lines of code or objects corresponding to a second intermediate representation with second annotations.

In some implementations, when generating output code for a variable with a reassigned data type, client device 210 may replace one or more objects relating to the variable. For example, replacing one or more double-precision data type variables with single-precision data type variables, without replacing associated objects of the input code with objects from a library associated with single-precision data type variables, may not produce working code. Client device 210, when generating the output code, may obtain objects (e.g., functions, scripts, expressions, etc.) of the program code from a library associated with single-precision data type variables, rather than from a library associated with double-precision data type variables. By obtaining the objects from the library associated with single-precision data type variables, client device 210 may produce working program code. In this way, client device 210 conserves processor power, simplifies conversion of variable data types, and improves a user experience when converting variable data types.

In some implementations, client device 210 may use annotations to modify execution of output code. For example, assume that client device 210 generates output code that includes a particular variable. Assume further that client device 210 receives an instruction to determine a data type of the particular variable based on a level of precision needed for an output relating to the particular variable. That is, assume that the particular variable is used as an input to an expression, and the expression outputs a value at different levels of precision based on information stored by the particular variable. When the particular variable is associated with a large quantity of bits (e.g., 64 bits, 128 bits, etc.), the expression may output the value at a higher level of precision than when the expression is associated with a small quantity of bits (e.g., 8 bits, 16 bits, 32 bits, etc.). Client device 210 may receive the instruction to cause client device 210 to determine a lowest quantity of bits, of the particular variable, that will cause the value to satisfy a threshold level of precision.

In such a case, when generating the intermediate representation, client device 210 may associate an annotation with the particular variable based on the instruction. The annotation may identify a location at which to obtain specification information identifying a specified data type to use for the particular variable. Output code that is generated based on the intermediate representation may obtain the specification information to determine the specified data type. Client device 210 may execute the output code multiple times, and may modify the specification information for each execution of the output code. In some implementations, the annotation may cause the output code, when executed, to modify the specification information. For example, the annotation may identify different data types to use as specified data types. Client device 210 may determine whether each value, corresponding to each specified data type, satisfies the threshold. In this way, client device 210 can iteratively modify execution of program code using annotations, which permits client device 210 to improve efficiency of (e.g., optimize) data types of variables of the program code.

In some implementations, an annotation may cause client device 210 to obtain information when compiling output code based on an intermediate representation, or when generating an intermediate representation based on conversion information. For example, the annotation may specify a location at which the information is stored, and client device 210 may obtain the information when compiling output code or generating the intermediate representation. The information may include, for example, data, a data type, a local variable, a global variable, a temporary variable, a function, an expression, a line of code, a subroutine, a program, or a similar object.

In some implementations, client device 210 may use annotations to improve performance of program code with regard to an expression included in the program code. For example, assume that input code includes an expression that determines a sine value of an input value. Client device 210 may receive conversion information indicating to associate an annotation with the expression. The annotation may cause client device 210 to generate output code that includes one or more operations in place of the expression (e.g., an operation to look up an approximation of the sine value in a table, an operation to approximate the sine value using fewer resources than the expression, etc.). When client device 210 generates the output code, client device 210 may replace the expression with the one or more operations, which conserves processor power that is otherwise used to evaluate the expression when executing the output code.

In some implementations, when generating output code, client device 210 may evaluate a condition based on an annotation. For example, the annotation may identify conditions based on which to selectively perform a first conversion operation or a second conversion operation, and client device 210 may selectively perform the first conversion operation or the second conversion operation with regard to one or more objects based on if the conditions are satisfied. As one possible example, a condition may specify to use a first sine function when input values to the function are between zero and 2*pi, and may specify to use a second, more efficient sine function when the input values are between zero and pi/2. Client device 210 may selectively use the first sine function or the second sine function based on determining a range of the input values. In this way, client device 210 determines output code based on conditional conversion information, which improves versatility of output code and enables further improvement of output code with regard to efficiency.

As further shown in FIG. 5, process 500 may include outputting the output code and/or information relating to the output code (block 550). For example, client device 210 (e.g., TCE 220) may output the output code. In some implementations, client device 210 may execute the output code. In some implementations, client device 210 may generate output code in a variety of programming languages (e.g., C, C++, C#, Ada, Java, HDL, etc.), and may output an executable, a code file, or the like, for each of the variety of programming languages. In some implementations, client device 210 may store the output code. In some implementations, client device 210 may output diagnostic messages and/or diagnostic information describing the conversion information and/or the output code, as described in more detail below.

In some implementations, client device 210 may determine whether a result of executing the output code matches a result of executing the input code. For example, when the input code is associated with one or more variables of a first data type and the output code is associated with one or more variables of a second data type, client device 210 may execute the input code and the output code to determine whether outputs of the input code match outputs of the output code. In a situation where the outputs match, client device 210 may provide information indicating that the outputs match (e.g., that data type reassignment was successful). In a situation where one or more outputs do not match, client device 210 may determine and/or provide diagnostic information, as described in more detail below.

In some implementations, client device 210 may provide diagnostic messages based on generating and/or executing output code. For example, client device 210 may determine that one or more outputs of input code do not match one or more outputs of output code, and may provide a diagnostic message identifying a line of code associated with the mismatch, an expression that causes the mismatch, a reason for the mismatch, or the like. As another example, client device 210 may provide diagnostic messages for one or more variables and/or objects of the output code. For example, client device 210 may provide information identifying corresponding variables and/or objects in input code, may provide information identifying conversion information for the one or more variables and/or objects, or the like.

In some implementations, client device 210 may provide diagnostic information via a user interface. For example, the user interface may show input code, output code, and/or diagnostic information. In some implementations, client device 210 may receive an interaction with a particular object (e.g., an object in input code, in output code, etc.), and may display information corresponding to the particular object, such as a corresponding object (e.g., an object in output code when the particular object is in input code, an object in input code when the particular object is in output code, etc.), conversion information associated with the particular object, a data type of the particular object, one or more variables that are inputted to and/or outputted by the particular object, or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a device can convert variables of program code from first data types to second data types without requiring a user to generate output code with the second data types, which conserves processor resources and storage resources, and which reduces a likelihood of error on the part of the user. Further, the device can perform diagnostic operations on the converted code to improve efficiency of the code and/or detect errors in the converted code, which also conserves processor resources and storage resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code, input code, output code, etc.) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive input code,
the input code being used in connection with generation of output code, and
the input code including one or more input objects;
generate, based on conversion information and the input code, an intermediate representation including an annotation,
the conversion information describing the annotation;
generate, based on the intermediate representation, the output code including the one or more modified output objects;
perform a first execution of the output code using a particular data type;
perform a second execution of the output code using another data type that is different from the particular data type,
the annotation identifying specification information for a particular variable,
the specification information specifying the particular data type for the particular variable during the first execution of the output code, and the specification information specifying the other data type for the particular variable during the second execution of the output code;

select a selected data type based on an output of the first execution and an output of the second execution; and provide information identifying the selected data type.

2. The device of claim 1, where the one or more processors are further to:

receive the conversion information separately from the input code.

3. The device of claim 1, where the one or more processors are further to:

determine the conversion information based on a library associated with a programming language in which the output code is to be generated.

4. The device of claim 1, where the one or more modified output objects include the particular variable; and where the one or more processors are further to:

determine the conversion information based on an expression in the output code that receives the particular variable as input or outputs the particular variable.

5. The device of claim 1, where the conversion information is first conversion information;

where the output code is first output code;

where the intermediate representation is a first intermediate representation; and where the one or more processors are further to:

receive second conversion information;

generate a second intermediate representation based on the input code and based on the second conversion information, the second intermediate representation including another annotation that is generated based on the second conversion information; and generate second output code based on the second intermediate representation.

6. The device of claim 5, where the second intermediate representation is generated based on modifying the first intermediate representation.

7. The device of claim 5, where the second conversion information is received as the first intermediate representation is generated.

8. The device of claim 1, where the annotation identifies a location at which to obtain the specification information for the particular variable, and where the one or more processors are further to:

modify, for the first execution of the output code, the specification information to specify the particular data type for the particular variable, and modify, for the second execution of the output code, the specification information to specify the other data type for the particular variable.

9. A non-transitory computer-readable medium storing instructions, the instructions comprising:

one or more instructions that, when executed by one or more processors, cause the one or more processors to:

receive input code that includes one or more input objects, the input code being used in connection with generation of output code, and the output code, when generated, including one or more output objects, corresponding to and different than the one or more input objects;

generate, based on conversion information and the input code, an intermediate representation, the intermediate representation including one or more annotations corresponding to the one or more input objects;

generate, based on the intermediate representation, the output code;

perform a first execution of the output code using a particular data type;

perform a second execution of the output code using another data type that is different from the particular data type, the one or more annotations including an annotation that identifies specification information for a particular variable, the specification information specifying the particular data type for the particular variable during the first execution of the output code, and the specification information specifying the other data type for the particular variable during the second execution of the output code;

select a selected data type based on an output of the first execution and an output of the second execution; and provide information identifying the selected data type.

10. The non-transitory computer-readable medium of claim 9, where the one or more instructions further cause the one or more processors to:

determine that a first expression in the input code is to be replaced with a second expression in the output code; and where the one or more instructions, that cause the one or more processors to generate the output code, cause the one or more processors to:

generate the output code to include the second expression in place of the first expression.

11. The non-transitory computer-readable medium of claim 9, where the input code is in a different programming language than the output code.

12. The non-transitory computer-readable medium of claim 9, where the one or more input objects include at least one of:

data, a data type, a local variable, a global variable, a temporary variable, a function, an expression, a line of code, a subroutine, or a program.

13. The non-transitory computer-readable medium of claim 9, where the one or more instructions, that cause the one or more processors to generate the output code, cause the one or more processors to:

generate multiple output code files, at least one output code file, of the multiple output code files, being associated with a different programming language than any other output code file, of the multiple output code files.

14. The non-transitory computer-readable medium of claim 9, where the selected data type is selected based on whether the output of the first execution or the output of the second execution satisfies a threshold.

15. The non-transitory computer-readable medium of claim 9, where the one or more instructions further cause the one or more processors to:
 obtain a particular object based on the one or more annotations,
 the particular object being used in the output code.

16. The non-transitory computer-readable medium of claim 15,
 where the particular object is a first object; and
 where the one or more instructions further cause the one or more processors to:
  compile first output code and second output code,
   the first output code being generated including the first object, and
   the second output code being generated including a second object that is obtained based on the one or more annotations.

17. The non-transitory computer-readable medium of claim 9, where the one or more instructions further cause the one or more processors to:
 modify, for the first execution of the output code, the specification information to specify the particular data type for the particular variable, and
 modify, for the second execution of the output code, the specification information to specify the other data type for the particular variable.

18. A method, comprising:
 receiving input code,
  the input code being used in connection with generation of output code,
  the input code including one or more input objects,
  the output code, when generated, including one or more output objects, corresponding to the one or more input objects,
  the receiving being performed by one or more devices, and
  the one or more devices including a device that includes a processor;
 generating, based on conversion information and the input code, an intermediate representation,
  the intermediate representation including one or more annotations corresponding to the one or more input objects, and
  the generating being performed by the one or more devices;
 generating, based on the intermediate representation, the output code,
  the generating the output code being performed by the one or more devices;
 performing a first execution of the output code using a particular data type,
  the performing the first execution of the output code being performed by the one or more devices;
 performing a second execution of the output code using another data type that is different from the particular data type,
  the one or more annotations include an annotation that identifies specification information for a particular variable,
  the specification information specifying the particular data type for the particular variable during the first execution of the output code,
  the specification information specifying the other data type for the particular variable during the second execution of the output code, and
  the performing the second execution of the output code being performed by the one or more devices;
 selecting a selected data type based on an output of the first execution and an output of the second execution,
  the selecting being performed by the one or more devices; and
 providing information identifying the selected data type,
  the providing the information identifying the selected data type being performed by the one or more devices.

19. The method of claim 18, further comprising:
 providing, for display, information identifying the one or more input objects and the one or more output objects.

20. The method of claim 18, further comprising:
 providing information pertaining to the one or more output objects in association with the output code,
  the information pertaining to the one or more output objects being provided for display in association with the one or more output objects in the output code.

21. The method of claim 18, further comprising:
 determining that a particular output object, of the one or more output objects, is not to be assigned the particular data type; and
 providing a message indicating that the particular output object is not to be assigned the particular data type.

22. The method of claim 21, where determining that the particular output object is not to be assigned the particular data type comprises:
 determining, based on an operation to be performed with regard to the particular output object being incompatible with the particular data type, that the particular output object is not to be assigned the particular data type.

23. The method of claim 18, further comprising:
 modifying, for the first execution of the output code, the specification information to specify the particular data type for the particular variable, and
 modifying, for the second execution of the output code, the specification information to specify the other data type for the particular variable.

* * * * *